March 7, 1939. F. L. RIVENBURGH 2,149,686
EGG TESTING METHOD AND MACHINE
Filed June 3, 1936 4 Sheets-Sheet 1

Fig. 1.

Inventor
Frederick L. Rivenburgh,
By Mason & Porter
Attorneys

March 7, 1939. F. L. RIVENBURGH 2,149,686
EGG TESTING METHOD AND MACHINE
Filed June 3, 1936 4 Sheets—Sheet 3

Inventor
Frederick L. Rivenburgh,
By Mason & Porter
Attorneys

March 7, 1939. F. L. RIVENBURGH 2,149,686
EGG TESTING METHOD AND MACHINE
Filed June 3, 1936 4 Sheets-Sheet 4

Inventor
Frederick L. Rivenburgh,
By
Attorneys

Patented Mar. 7, 1939

2,149,686

UNITED STATES PATENT OFFICE 2,149,686

EGG TESTING METHOD AND MACHINE

Frederick L. Rivenburgh, Springfield, Ohio

Application June 3, 1936, Serial No. 83,383

23 Claims. (Cl. 209—81)

This invention relates to a method and machine for testing and sorting eggs; and employs an electrical apparatus for determining a characteristic of the egg, and utilizes the response within the apparatus for sorting the eggs into groups in accordance with the determination thus afforded.

One of the features of the present invention consists in the provision of an apparatus for successively preparing and advancing the eggs for testing, means for testing the eggs, and devices responsive to the indication a test for sorting the eggs into groups.

Another feature is the provision of a method and apparatus for locally reducing the electrical resistance between points of the egg which are at different levels of height by substantially eliminating the electrical resistance of the egg shell thereat.

Another feature of the present invention is the provision of means for advancing the eggs through a pre-treating zone in which they are rendered more capable of response during testing, a testing zone, and a sorting zone; together with the provision of means for testing the egg and determining the selection accomplished in the sorting zone.

A further feature of the present invention is the provision of synchronized means for conveying the eggs successively through a pre-treating zone, a testing zone, and a sorting zone, along with devices operated in the several zones, the regularity of advancement of the eggs being employed for assuring the existence of standard conditions during the testing.

Still another feature of the present invention is the provision of a means for conveying the eggs, devices for prewetting the egg shell before testing, testing electrodes associated with electrical circuit means for giving an amplified response, and sorting means energized when the response of a particular egg is of a given characteristic and serving to prepare for the sorting of the egg when this egg arrives in a selecting zone.

A further feature of the present invention is the provision of an egg testing apparatus which is responsive to the potential difference exsiting in eggs of character acceptable for hatching, for example, or for other purposes.

Another feature of the present invention is the provision of a method of testing eggs with respect to hatchability by determining the potential difference inherent in the eggs undergoing test.

A further feature of the invention is the provision of a method of testing by reducing the resistance of the egg shell and membrane to the passage of current therethrough, and then determining the potential difference inherent in the egg.

Still another feature of the present invention is the provision of a method of testing eggs by determining the relative positive or negative polarity existing, by reason of the inherent potential difference, between the top and bottom of an egg of hatchable nature.

Still another feature of the present invention is the provision of an apparatus and a method for testing eggs by which the eggs are maintained in a horizontal position and against rotation about a horizontal axis for a predetermined time, are subjected to a pre-wetting treatment at localized portions of their tops and bottoms for a predetermined time, are tested for inherent potential differences between said localized wetted areas, and then are selected in accordance with the potential differences so determined.

Other features of the invention reside in particular details of construction and arrangement of the several parts and in their combinations and operation, as will be set out in the course of the following specification and claims.

An illustrative form of practicing the invention is shown on the accompanying drawings, in which.

In these drawings, the apparatus is illustrated as having the supporting legs 10 for a frame consisting of the two longitudinal sills 11 and the two end sills 12 which are connected rigidly together for supporting other parts of the mechanism. Rising from the longitudinal sills 11 are the angular pieces 13 providing legs for supporting the upper rails 14 which provide spaced supporting guides for an upper flight of the conveyor belt.

A main driving pulley P is fixed on a transverse shaft 17 mounted by bearings 18 on the side sills 11, and having a worm 19 engaged with the worm wheel 20 of the lengthwise extending main shaft 21 which is supported by the hangers 22.

A drum shaft 23 at the feeding end of the apparatus is mounted on bearings 24 and supports a feeding drum 25. Adjacent the discharge end of the machine is a second drum shaft 26 mounted on bearings 27 and having a ratchet 28 fixed thereto, outside of the frame in this illustrated form; and also having a second drum 29 secured thereto, so that the drum may be turned as the ratchet 28 is advanced.

Figures 3, 9, 10:
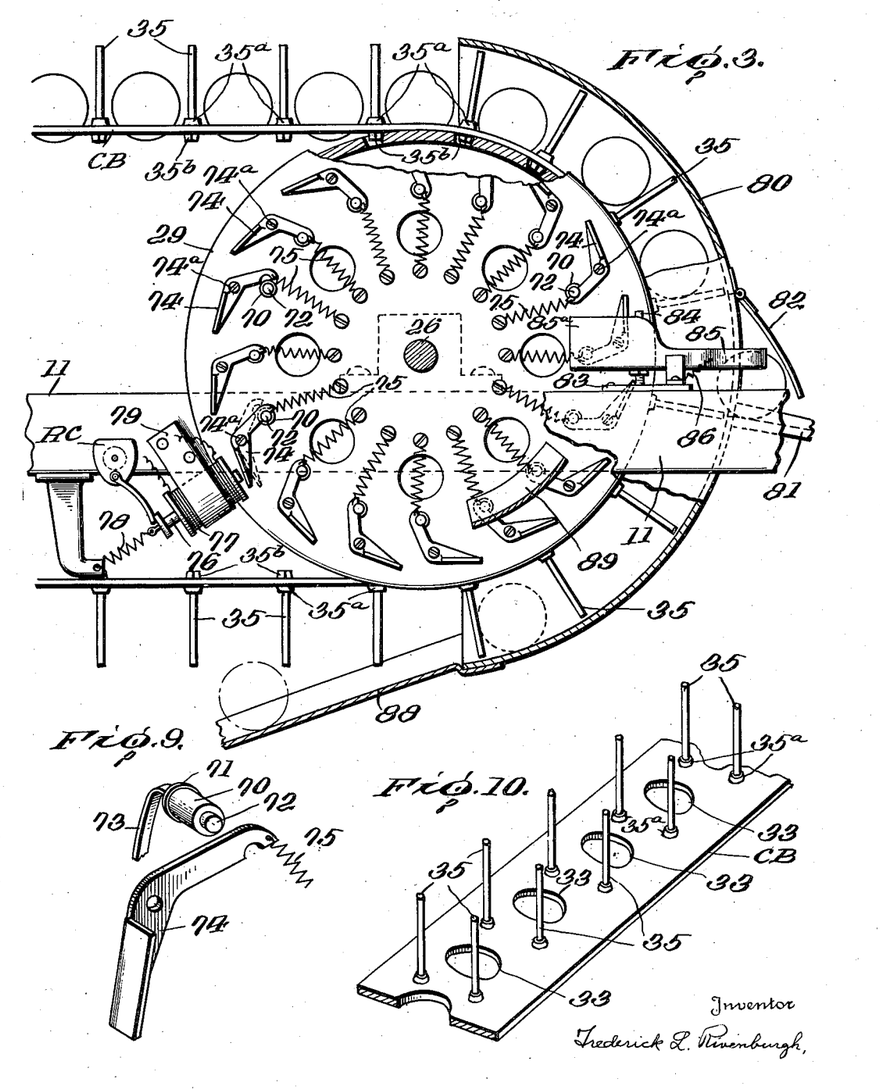
Figure 3 is a fragmental elevation partly in section, on an enlarged scale, of the pre-selector drum and the egg-discharging mechanism.
Figure 9 is a perspective view of a selector pin and its detaining pawl, with the drum wall removed.
Figure 10 is a perspective view showing a portion of the conveyor belt with its apertures and pins.

The drums 25 and 29 receive a conveyor belt CB which is shown in Fig. 10 to have a plurality of apertures 33 which are oval in shape and are smaller than the eggs to be tested but provide an adequate support against rolling of the eggs. The eggs extend downwardly below the lower surface of the belt CB. Between each two apertures on the belt CB is provided a pair of transversely spaced pins 35 which prevent rotation of the egg about a vertical axis and rolling of the egg along the length of the belt. These pins 35 preferably have collars 35a (Fig. 10) above the belt, and have nuts 35b engaging threaded ends at the inner side of the conveyor belt (Fig. 3) for reception in corresponding cavities in the drums 25 and 29.

The eggs may be introduced to the apparatus by movement along a guide channel 36 from which the eggs are lifted by the pairs of pins 35 and thus brought to the top of the drum 25 so that the eggs are received in the holes 33. These pins cooperate with the body of the belt CB and pick up the eggs from the inlet guide channel 36, and center them with respect to the holes 33 in the conveyor belt; and likewise operate for guiding the eggs falling along the belt near the hood 80, and to center them for proper release at the outlet channel 81.

The belt passes successively through a pretreating zone, a testing zone, and a selecting zone. Since the eggs naturally have a high resistance, it is desirable to decrease this resistance as much as possible without injury to the vitality of the egg, before testing the egg. In the form shown in Figs. 1 and 2, this is accomplished by the utilization of wetting structures WS, of which four are shown. The testing system comprises a pair of electrodes which are presented at the top and the bottom of the egg by testing structure TS, of which one is shown on the drawings. The selecting zone is comprised upon and around the second drum 29, and will be described more in detail hereinafter. Between the testing and the delivering of the eggs to the exit channels, it is preferred to include also a cleaning structure CS for removing superficial treating solution from the egg shells.

Figures 6, 7, 8, 11:
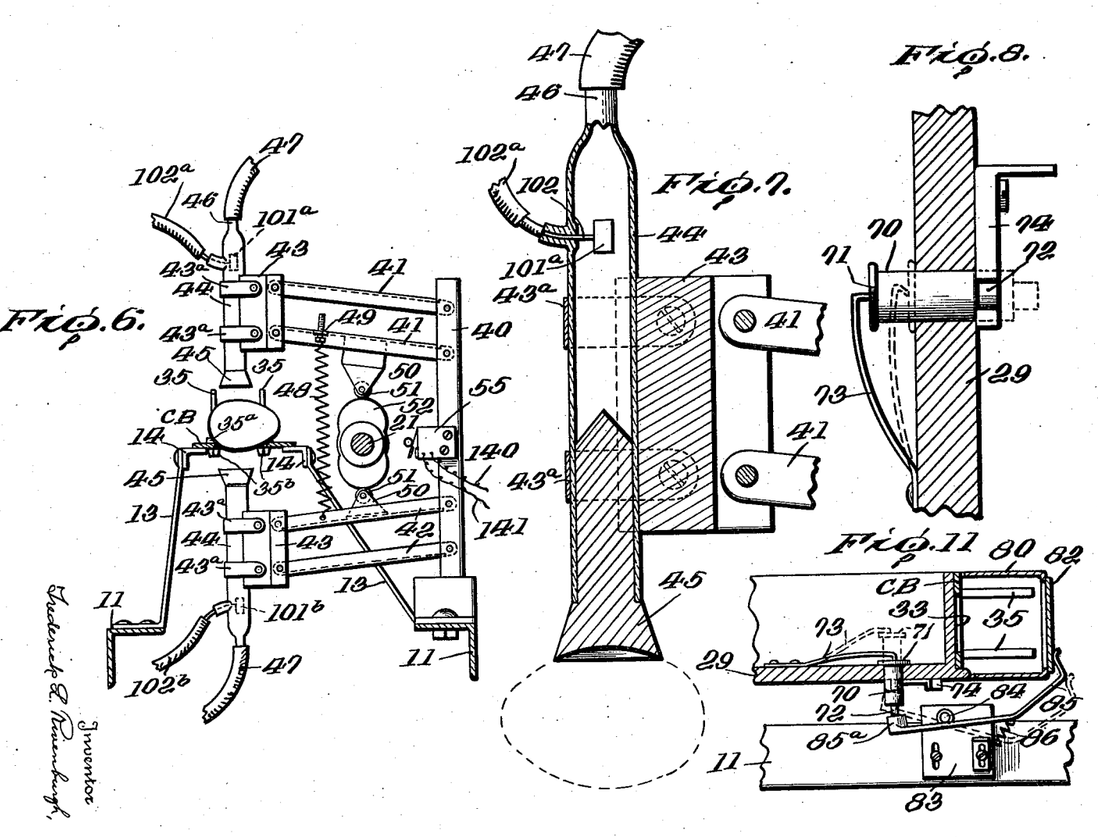
Figure 6 is a cross-sectional view through the electrode holder structures.
Figure 7 is a greatly enlarged view showing an electrode in section.
Figure 8 is an enlarged sectional view through a portion of the selector drum.
Figure 11 is a detail substantially on line 11—11 of Fig. 8.

The structures WS, TS and CS comprise actuating mechanisms which are substantially identical in design, and are each driven from the main longitudinal shaft 21 so that proper synchronism is observed between the movements of the belt and eggs and the operations of these structures. As shown in Fig. 6, these structures comprise the supporting columns 40 secured to the rear longitudinal sill member 11 and provided with two pairs of parallel-motion links 41, 42 which are joined at their outer ends by the holders 43. Each of these holders for the structures WS and TS supports an assembly for the regulated delivery of wetting solution to the surface of the egg shell, comprising the outer casing structure 44, a porous application wick 45, and an end 46 connected to the supply conduit 47. The two pairs of parallel-motion links are connected by a spring 48 having a tension adjusting member 49. The adjacent links in the two pairs are provided with supports 50 for the rollers 51 which cooperate with the cam pieces 52 mounted on the shaft 21. These cams are symmetrical, that is, they have two humps which operate simultaneously upon the upper and lower rollers 51 so that the holders 43 are moved toward and away from one another in unison.

The structure CS resembles that set out in Fig. 6 with respect to the actuating parts, but its conduit 47a is connected (Fig. 1) to a conduit 47b leading to a vacuum pump.

For the purpose of closing a switch in the selector circuit, as will be described hereinafter, a switch structure 55 is mounted on one post 40 to be actuated by the cam 52 each time that the shaft 21 causes all holders 43 to be brought toward one another for contacting the eggs located therebetween.

Figure 1:
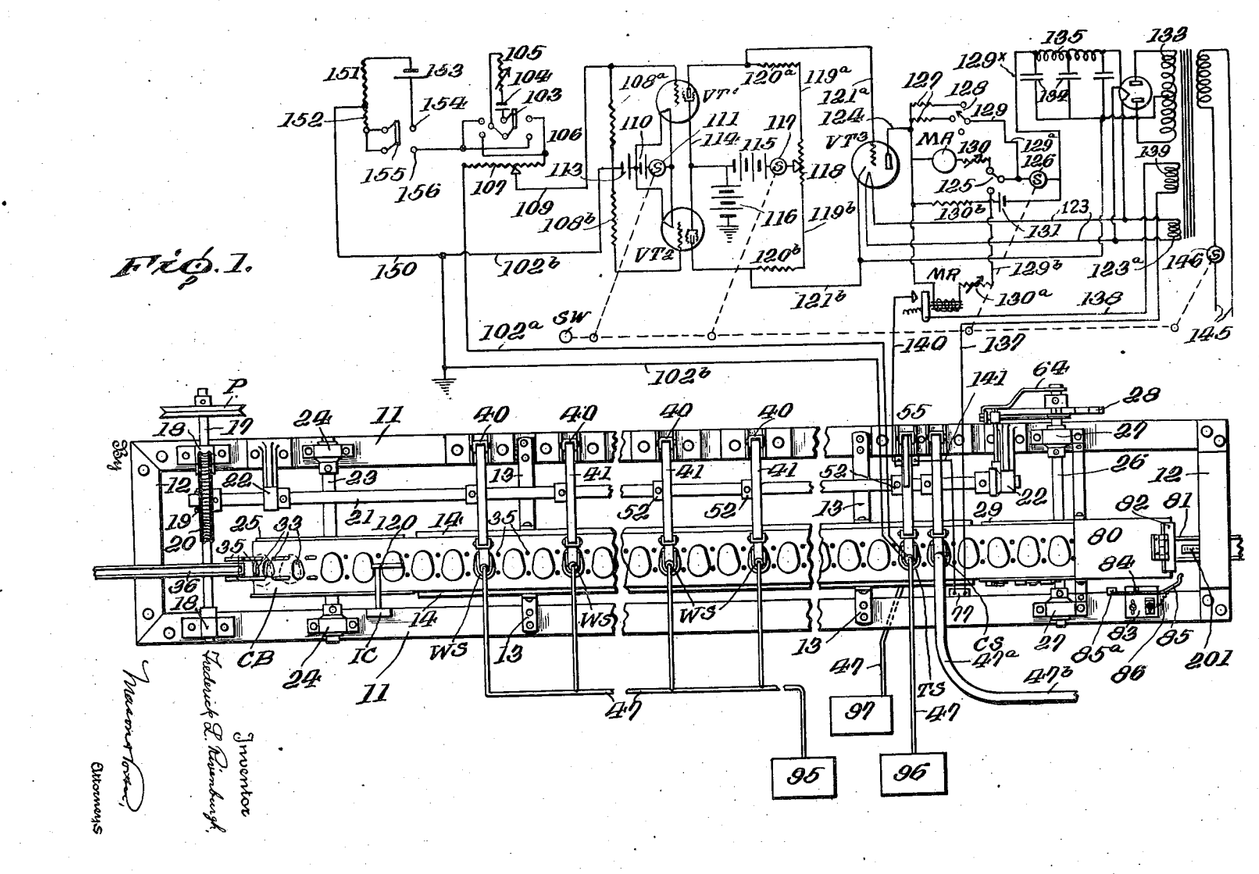
Figure 1 is a plan view of the mechanism, and indicates an associated electrical circuit diagrammatically.
Figures 2, 4, 5:
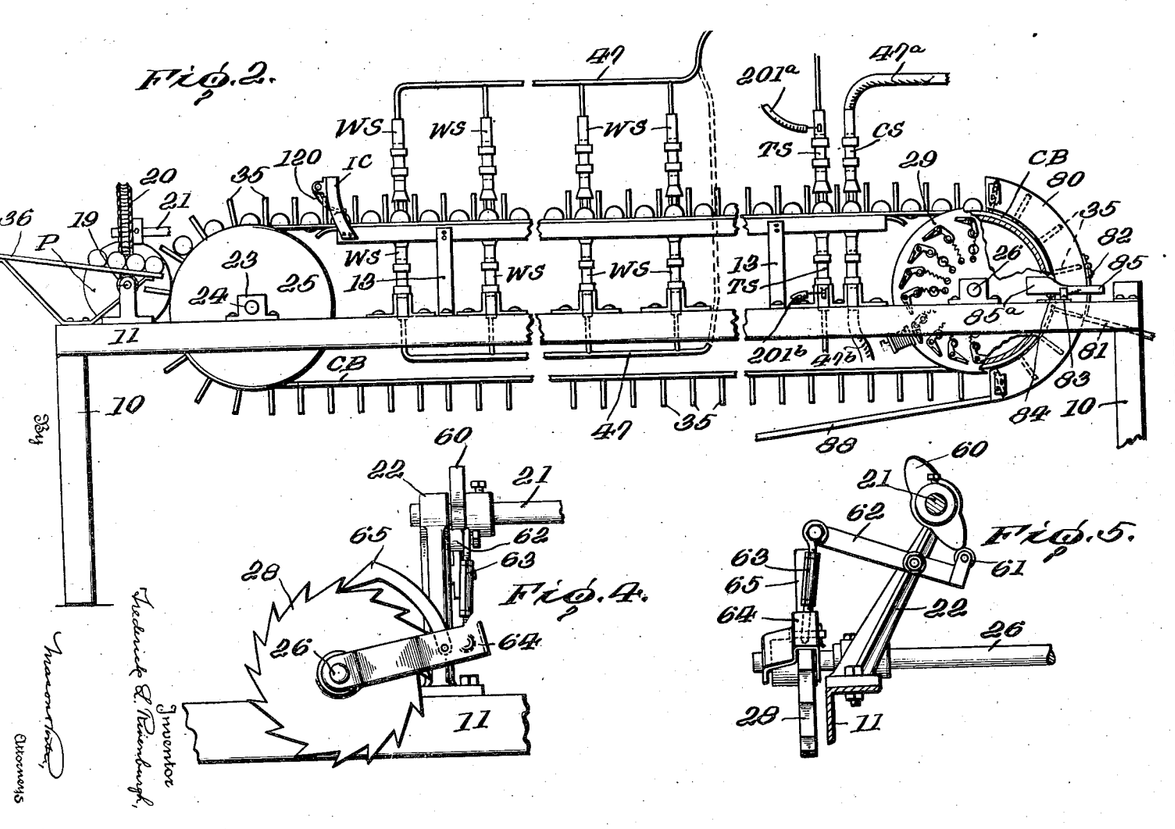
Figure 2 is a side elevation of the machine, partly in section.
Figures 4 and 5 are respectively, on an enlarged scale, a side elevation and an end elevation of the drum stepper mechanism.

As shown in Figs. 1, 4 and 5, the shaft 21 also has a further cam 60 fixed thereon for engaging a roller 61 mounted on a rock arm 62 pivotally supported on the adjacent hanger 22. It will be noted that the cam 60 has two humps, so that it produces two reciprocations of the rock arm 62 for each revolution of the shaft 21, these movements being timed so that they occur during the periods at which the wider humps of cams 52 are operating to maintain the holders 43 separated; and thus no obstruction is afforded by the parts supported thereby to the advancing movement of the eggs on the conveyor belt CB. The arm 62 is connected by a link 63 of adjustable length with the end of a rock arm 64 which is loosely mounted on the end of the shaft 26: it is preferred to form this rock arm 64 to engage both the inner face and also the outer hub of the ratchet 28, so that this ratchet serves to maintain the arm in proper operating position. The rock arm 64 supports a pawl 65 which is engaged with the teeth of the ratchet wheel 28. In operation, the rock arm 64 moves the pawl 65 back and forth once for every half revolution of the shaft 21, and thus produces a rocking of the ratchet 28 once for each half revolution of the shaft 21, and therefore once for each approach and receding movement of the holders 43.

It will be noted that the ratchet 28 is illustratively shown with sixteen teeth, so that eight revolutions of the shaft 21 are required for one revolution of the shaft 26.

The drum 29 has sixteen equally spaced apertures on its front face (Fig. 2), each of which receives a pin (Fig. 8) having a body 70 guided in the aperture, an inner end flange 71 to prevent the movement of the pin through the aperture, and a reduced outer end 72 providing a shoulder. Inside the drum 29 is provided a plurality of leaf springs 73 each cooperating with one of the pins 70 for pressing it normally outward. Each pin is provided with a locking device comprising the rock lever 74 having a notched arm which normally rests against the shoulder of the pin 70 and is limited against a further relative clockwise movement (Fig. 3) by engaging the reduced portion 72 of the pin. This tendency toward clockwise movement is produced by the individual springs 75 which connect an end of the rock lever 74 with a fixed point on the outer face of the drum 29. The other arms of the rock levers are successively brought opposite the plunger 76 of a solenoid 77, this plunger being normally held in the left-hand position (Fig. 3) by a return spring 78. The solenoid is secured to the adjacent longitudinal sill 11 by a strap 79. When the solenoid 77 is energized, in the manner described hereinafter, its core or armature 76 is projected toward the right (Fig. 3) and impacts against the rock lever 74 which is momentarily positioned opposite it, and causes a counterclockwise movement of the rock lever about its pivot 74a on the drum 29, so that the notched end passes from above the shoulder of pin 70; and this pin is then projected outwardly by the leaf spring 73. The engagement of the larger portion of the pin 70 with the rock lever 74 prevents the return of the latter to the former position.

As there are sixteen teeth on the ratchet 28, sixteen pins 70 with corresponding rock levers 74 are provided on the drum 29; and in like manner, sixteen egg holders of the belt CB are moved past a given point for each revolution of the drum 29.

At the discharge end, the drum 29 is surrounded by a hood 80 having check walls to prevent lateral displacement of the eggs from between the pairs of pins, and a semicircular peripheral wall which is of slightly larger radius than the radius swept by the pins 35, so that these pins may move freely within the hood 80, but so that the eggs are maintained between the pairs of pins during this travel. Just below the horizontal plane of the axis of shaft 26, a discharge channel 81 is fastened beneath the end sill 12. Upwardly from the surface of the discharge channel 81, the hood 80 is provided with an orifice in its peripheral wall through which an egg may roll from the pair of pins 35, when these are positioned in substantial alignment with the discharge channel 81, and thus downward along the channel 81. Such is the normal discharge for eggs which have been found of proper quality for hatching purposes, for example. This orifice may be closed by a door 82.

A bracket arm 83, fixed to the rail 11, supports the pivot 84 of a selecting rock lever 85 which has one cam-like end 85a positioned in the path of such of the pins 70 as have been moved to the outermost position. This rock lever 85 has a return spring 86 for normally holding it in the dotted line position of Fig. 11. Thus when a pin 70 is in the outermost or actuated position, it encounters the lever 85 and causes the same to rock in a counterclockwise direction (Fig. 11) until it latches the door 82 against opening by the pressure of an egg, so that the corresponding egg cannot leave the pins 35 and move down the discharge channel 81, but is retained within the hood 80 and finally is carried to a point beneath the axis of shaft 26, and then is permitted to move downward along a second discharge channel 88.

At an angular position corresponding to the position of the pins 35 which have just passed from alignment with the discharge channel 81, the hood 80 is provided internally with a wedging or cam piece 89 which engages with the end of the reduced portion of each pin 70 which has been moved to its outward position and operates to depress or move such a pin inwardly until its shoulder is removed from the path of movement of the notched end of the corresponding rock lever 74, whereupon this rock lever is moved inwardly by its spring 75; and the pre-selector storage device thus constituted is restored to its former position ready for a fresh operation when this particular assemblage arrives opposite the core or plunger 76 of the solenoid 77, if the egg then under test is likewise to be selected for movement into the discharge conveyor 88 rather than into the discharge conveyor 81.

The electrode for the testing structure TS (Fig. 7) is preferably formed with its jacket 44 of insulating material, such as glass, condensate resin, etc. At the end adjacent the egg, this jacket is open and receives a porous body 45 through which the electrolyte solution is conducted to the surface of the egg. This electrode jacket is supported on the corresponding holder 43 by the straps 43a. The electrode structure includes the electrode plate 101 located within the jacket 44 and joined by an insulated and shielded conductor 102 to the electrical apparatus, as described hereinafter. The upper and lower electrodes are preferably formed identical, the inner end of the body 45 being tapered or inclined so that air bubbles in the lower electrode may not prevent the movement of liquid to the egg-engaged surface of the body 45 or prevent the proper flow of current. It is preferred to form the body 45 of felting and like material; and care should be taken to provide, however, an electrically neutral felting for this service, as either alkaline or acid reaction of the felting gives rise to certain accidental currents which raise certain difficulties of compensation, particularly as either acid or alkaline feltings are apt to be non-uniform in respect to one another.

The construction of the devices used in the holders 43 for the pre-wetting structures WS may be identical with the devices used as electrodes, although it is not necessary to provide the actual electrode plates 101 therein. Similarly, the cleaning structures CS may have devices of similar nature, care being taken to avoid penetration of air into the body 45 at points above the actual surface engaged with the egg, insofar as feasible.

The various pre-wetting structures WS are connected together so that their upper and lower jackets 44 receive a pre-wetting solution. It is preferred that this pre-wetting solution should be identical in chemical constitution with the solution which is being employed at the testing structure TS. Where silver chloride electrodes are employed, a 7 percent calcium chloride solution has been found to give excellent results. It will be noted that these pre-wetting structures WS are utilized for moistening the upper and lower surfaces of the eggs, without depositing such great quantities of solution thereon that trickling may occur downwardly along the egg shell surface to establish a short circuiting between the top and bottom wetted areas. Since no electrical conductivity is involved in the pre-wetting zone, all of these jackets 44 may be connected by their conduits 47 with a single reservoir 95. The upper and lower electrodes in the testing structure TS, however, must be maintained insulated from one another so far as feasible; and for this purpose separate tanks 96 and 97 of glass or the like are connected to the insulating conduits 47 leading respectively to the upper and lower electrodes.

The electrical system employed is designed for easy compensation and stabilization, and for the purpose of actuating the solenoid 77 according to the response of the particular egg, in this illustrative form of the invention in which the selection occurs into two groups.

The upper electrode plate 101a (Fig. 6) is connected by a conductor 102a with diagonally opposite terminals of a double-pole double-throw switch 103, and to one end of a potentiometer 107. The switch blades in this reversing switch 103 are connected by a biasing battery 104 and control resistance 105 connected in series. The other diagonally opposite poles are joined by a conductor 106 to the opposite terminal of the potentiometer 107. Thus, by changing the switch, the relative direction of potential of the battery 104 in the circuit may be varied. The lower electrode plate 101b is connected by a conductor 102b with the ground and with the central point of a pair of grid controlling resistances 108a, 108b. The conductor 109 leads from the intermediate point of the potentiometer 107 to the other end of the grid control resistance 108a, and to the grid of a vacuum tube VT1 of the "screen-grid" type. The other terminal of grid control resistance 108b is connected to the control grid of the screen-grid vacuum tube VT2. The filaments of the tubes VT1 and VT2 are connected together and supplied from a filament battery 110 through a control switch 111. A conductor containing a grid biasing battery 113 is joined to the conductor 102b so that the grid current can be eliminated. The screen grids of the vacuum tubes VT1 and VT2 are connected by the conductor 114 which extends to the negative terminal of the anode battery 115, the positive terminal of the screen grid biasing battery 116, and thence to the ground. The positive terminal of the anode battery 115 is connected to the switch 117 with an intermediate point of the adjusting or balancing resistance 118. One end of this adjusting resistance is connected by a conductor 119a and an anode circuit resistance 120a with the anode of the vacuum tube VT1, while the other terminal of the balancing resistance 118 is connected similarly by a conductor 119b and resistance 120b with the anode of the other vacuum tube VT2. These vacuum tubes VT1 and VT2 are connected together in so-called "push-pull bridge balance" arrangement for direct current amplification.

The response of the amplifying system, therefore, is to change the potential drop between the two anodes. The anode of vacuum tube VT1 is connected by a conductor 121a with the grid of a power amplifier VT3, while the anode of vacuum tube VT2 is connected by a conductor 121b with the cathode of the tube VT3. Owing to the sensitivity required and difficulties arising from stray currents, it is preferred to construct the initial or push-pull amplifier for actuating by current of rigorously maintained potential, as by using batteries for the filament, anode, control grid and screen grid circuits. Such can also be used for the power amplifier tube VT3; but since this tube is in effect multiplying the response of the first stage of amplification, it is possible to employ circuits so that this tube is operated from the usual alternating current supply means in the illustrated form. For this purpose the filament circuit conductors 123 lead to a transformer winding 123a, as usual. The anode of the power amplifier tube VT3 is connected by a conductor 124 with one terminal of the ammeter MA and one terminal of the coil of a relay MR, with the meter-control switch 126, and with a resistance 130b. This conductor 124 also is connected in multiple with a plurality of shunting resistors 127 of different resistances which are selected by a switch 128, this switch in turn being connected by a conductor 129 with the blade of a double-throw switch 125 having conductors 129a and 129b leading to the meter MA and the coil of relay MR. The conductor 129a has a branch including in series a resistance 130 which operates for balancing the meter; and conductor 129b has a similar branch including a resistance 130a for balancing the relay coil; the conductor 129 is also connected through switch 126 with conductor 129x, and thus with the supply for anode current. The compensating battery 131 is connected between the compensator resistance 130b and the conductor 129x. A conventional type of filter, comprising capacities 134 and chokes 135, is associated with a winding 133 of the power transformer for supplying conductors 121a, 121b with the necessary anode current for the vacuum tube VT3.

The normally closed contact points in the relay MR govern a circuit comprising a conductor 137 connected to the solenoid 77, a conductor 138 leading to a winding 139 of the power transformer, a conductor 140 leading from the contacts to the switch 55 (Fig. 6), and a conductor 141 leading from this switch to the solenoid 77.

The power transformer, comprising the windings 123a, 133 and 139, is supplied from the current mains 145 through a switch 146. It is preferred to mount the switches 111, 117, 126 and 146 on a single shaft, so that they may be turned on and off together.

For the purpose of calibrating the equipment, a branch 150 extends from the conductor 102b to a common point of two resistances 151, 152. The resistance 151 is connected to a standardizing battery 153, and this battery in turn is connected with a terminal 154 of a double-pole switch 155. The switch blade corresponding to terminal 154 is connected to the other end of resistance 152 and to the other switch blade. The terminal 156 for this other switch blade is connected to conductor 102a. The ratio of the resistances 151, 152 is preferably selected such that the potential between conductors 150 and 102a is a decimal fraction of the normal potential delivered by the battery 153 and of the same order of value as the normal potential of an acceptable egg. Since this battery is employed only from time to time for standardizing, the drain upon it is low and its life is long. In particular, it is thus possible to employ commercial batteries for the general standardization equipment without requiring expensive standard-cell set-ups.

It is preferred to provide the apparatus with counting and marking devices for controlling the operation of the machine and the product. For this purpose the first counting mechanism IC is provided upon a post 13b rising from a longitudinal sill 11. This counting mechanism includes a rockable actuating arm 120 which is positioned between the path of movement of the pairs of pins 35 so that it is contacted by the eggs as they pass forward with the conveyor belt CB, and hence this counter IC is actuated each time an egg passes beneath the finger 120. Similarly, a counter mechanism RC is mounted on the longitudinal sill 11 adjacent the solenoid 77, and is actuated by the plunger 76 thereof (Fig. 3) each time the solenoid moves this plunger, so that this counter RC registers the number of eggs which are rejected and passed to the second discharge channel 88. For the purpose of designating the eggs which have been found satisfactory for hatching, an inked pad 201 is provided in the floor of the discharge channel 81, and preferably has such a shape and conformation as to mark the selected eggs to designate the fact and date of selection, and is effective upon the eggs as the latter roll downward in the channel 81 over the surface of this pad.

The biological or incubation activity of fertile eggs is present at room temperature (70–80 degrees F.), but it is very much greater at the optimum incubation temperature (around 100 degrees F.). The electrical potential difference observed on the eggs is intimately connected with the metabolism and growth of the embryos. While it is possible to test the eggs immediately after laying, or after they have been cooled to room temperature, it is usually preferable to accomplish a short period of heating before making the test in order to effect a relative increase of the potential difference by the initial activity of the embryo in a fertile egg. The temperature to which the embryo is heated is preferably around the optimum incubation temperature, and should not exceed 110 degrees F. It will be understood, however, that an egg may be subjected to a higher external condition of heating in order to bring it to the desired temperature rapidly. This period, however, is preferably so short that no visible growth of a weakly-fertile egg has occurred, or that aging or decomposition of a sterile or dead egg may have occurred. For the purpose of the following description, a "fertile" egg will be understood to be one which is capable of further development by the usual cell division processes. A "weakly fertile" egg is one which is capable of further development from the time of test but is lacking in some wise in the vital energy which carries the embryo to full development and results in the production of a strong sturdy chick. A "dead" egg is one which has been fertile to some degree but whose normal capability of cell division has ceased. A "sterile" egg is one which has ab initio not been fertile.

Tests made after 3 to 6 hours of heating have been found to give excellent results, and highly satisfactory results have been obtained after 1½ hours of heating. It is preferred to heat for at least one hour. (The period of heating is calculated from the moment that the eggs, being at room temperature, are placed in the heating cabinet.) When the eggs are tested directly at room temperature, the electrical measurements are generally lower, and a certain proportion of the fertile eggs apparently give very little or no response. This increase of electrical effects arising from the very short heating periods may be referred to as having the effect of "arousing" the eggs; and it is preferred that the measurements should be made at the optimum temperature for producing this effect without danger of interruption or derangement of the usual cell division which constitutes growth of the embryo.

The germ within the egg is surrounded by various membranes and materials, and tends automatically to assume a definitely oriented position and to become located adjacent the top of the egg when the egg is left lying on its side. The time required for this varies slightly with the stage of development of the egg, and usually is around 10 seconds. Hence in testing eggs it is desirable to have each egg remain quiescent in a particular horizontal position for a period of time at least sufficient for the germ to adjust itself. This position is likewise characteristic in that the maximum potential difference develops when this position is maintained. For example, when an egg has been incubated for 2 to 3 days, the top electrode will be at 10 to 20 millivolts negative potential, relative to the bottom electrode. If the egg is turned upside-down and immediately tested, the upper electrode is positive with respect to the bottom electrode until the germ has oriented itself by rotation and/or displacement and returned to normal, and then the top electrode will again indicate a relative 10 to 20 millivolt negative potential with respect to the bottom electrode, which may be regarded as a predetermined standard of electromotive force which is demonstrated by hatchable eggs of this history. Similarly, determinations of standards for groups of eggs of differing history may be established.

As instances of the potential differences which have been observed in testing eggs, the following may be noted:

*Table*

| Period of pre-heating | Potential difference |
| --- | --- |
| | m-v. |
| Room temp. 70–80° F | 1–3 negative |
| 2–6 hours | 1–4 negative |
| 1 day | 2–6 negative |
| 3 days | 10–20 negative |
| 5 days | 20–40 positive |
| 7 days | 20–50 positive |

After the seventh day, the ability of the germ to orient itself is gradually lost and the potential difference depends upon the position of the embryo between the electrodes; its maximum value is around 50 millivolts.

Sometimes the reversal of an egg does not produce the immediate reversal of relative potential at the electrodes, followed by the slow recovery to the former condition. One cause of this is that the embryo is sticking to the shell. In this case, the measurement may indicate that the egg is sterile when such is not the case. However, this indication means that the egg will not be employed for hatching—a desirable type of selection as the embryo of such eggs generally die in the shell.

The dry shell and underlying membrane of an egg is practically an insulator as the resistance is usually greater than 10 megohms. Hence the preparatory treatment of the egg prior to test has been devised to include preferably a wetting with a solution in order to reduce the resistance. As an alternative for such prewetting, electrodes of material such as silver or platinum-iridium, and having a diameter of, say, one ten-thousandth of an inch for a length of one thirty-second of an inch may be caused to penetrate the egg shell, and to contact through the shell membranes; this does not have an injurious effect upon the embryo or cause cracking of the shell when due precautions as to size, pressures, etc., are observed: in such cases, no prewetting or aftercleaning is necessary. Since present vacuum tubes tend to be unstable unless a closed external grid-cathode path is provided with a resistance of the same order as the internal resistance of this path, and since such a constantly-closed path would be in shunt of the path through the egg and hence will carry a part of the current effects derived from the egg, it is usually necessary to reduce the effective resistance between the wetted spots at the top and bottom of the egg shell to a value less than 500,000 ohms in order to avoid too expensive losses and to permit stable operation of the amplifier system. It has been found that wetting the surfaces of the eggs in spots at top and bottom which are about ¾ of an inch in diameter each, is sufficient to effect a diminution of the resistance which drops gradually until it may reach a value of 500,000 to 100,000 ohms: in some instances it can be reduced to as low as 30,000 ohms by appropriate handling. The action of the devices 45 in the wetting structures is to apply a slight frictional rubbing or mechanical agitation which is advantageous in effecting a quick penetration of the solution into the egg shell. The time required for the penetration of this solution varies by reason of several factors, but it has been found that 1 to 2 minutes is sufficient in practically all instances to permit comparisons of groups of eggs which do not have unusual shell formations, or an unusual deposit of extraneous material, for example. It is necessary to prevent the current from running around the egg from the top spot to the bottom spot, or to any grounded portion of the structure. This is avoided by having the conveyor belt of insulating material, and by having the felts of such absorption properties and supplied by liquid under a sufficient head to cause the moistening of the surfaces of the felt which encounter the egg shell without actual dripping or excess saturation thereof. It may be pointed out that the presence of the relatively narrow wetted strip between the top and bottom spots will have a much less resistance than that of the path through the shell, the various membranes, and the germ structures, or than that of the external circuit. By way of comparison it may be pointed out that the resistance between two properly wetted spots and the potential difference created thereat by the egg is substantially the same as the resistance and potential difference determined by removing portions of the egg shell and testing the contents directly.

The electrodes and electrolyte solution, and hence the pre-wetting solutions, should not contain materials which may be introduced through the egg shells and act as a poison upon the egg.

It is preferred to employ non-polarizable or reversible electrodes, such as silver-silver chloride electrodes: platinum electrodes have been used successfully. The electrolyte for such electrodes may comprise solutions of calcium, sodium or potassium chlorides individually or in mixture. In an actual structure, the electrodes were formed by using a thin sheet of silver having a surface of about ½ a square inch located in a glass tube 44 one inch in diameter and six inches long. The tube was filled with a chloride solution, another piece of silver brought into contact with the solution, and current passed under a pressure of 3 volts for about 10 minutes, with the electrode connected to the positive pole in order to coat the electrodes with silver chloride.

It is preferred to employ calcium chloride in concentrations from 3 to 10 percent, preferably around 7 percent, for the particular arrangement of circuit and other parts shown on the drawings. The solution preferably has a pH around 7.2. A more acid solution appears definitely unfavorable, but a slight alkalinity may be tolerated.

The machine may be operated as follows:

The switches 111, 117, 126 and 146 are closed by operating the knob Sw. The vacuum tubes are permitted to warm up for a sufficient time to assure stability in normal operation.

The circuits may be checked for balance and continuity by placing the selector switch 128 for connecting the shunt 127 of lowest resistance in parallel with the meter MA; and switch 125 is connected for flow of current through this meter. With the electrodes separated and the switches 103, 155 open, the meter MA should be at a proper initial point of the scale. It is preferred to have this meter of "galvanometer type" and to adjust it so that the "zero" on the scale represents the normal open-circuit condition of the parts. The sensitivity of the meter can be varied by resistance 130, while the potentiometer 118 is varied to bring the reading back to zero. The switch 103 is then closed in either direction. With the electrode structures in contact and saturated with the normal wetting liquid, the meter MA should remain at zero if there is no contact difference of potential between the electrode plates 101a, 101b. Any change of reading of the meter can now be compensated by movement of the potentiometer 107, possibly with a reversal of the compensating voltage, by changing the switch 103. When this primary adjustment has been accomplished, the electrode structures are separated again and a final adjustment obtained by moving the switch 128 to a contact representing a higher resistance in shunt of the meter MA; and this meter is then balanced and electrode potentials corrected as before. This can be repeated successively according to the number of shunt resistors 127 employed, so that ultimately a very fine adjustment of balance is attained.

It is now desirable to standardize the device. This is done by closing the switch 155 and noting the reading at the meter MA. Since the battery 153 gives a substantially constant potential, the readings of the meter should be uniform from day to day when this test is being made.

The switch 125 is now shifted so that the output current of the tube VT3 flows through the relay MR. The standardizing current should now operate to energize the relay and move its armature. The sensitivity of this relay may be adjusted by the resistance 130a, so that the relay will just close with the preselected standardizing potential difference between terminal 154 and conductor 150, this potential difference being selected to correspond with the potential differences existing in eggs which are "good" for hatching, as distinguished from lower potential differences of eggs which are "bad" for hatching. This particular potential difference will vary, as set out herein, according to the length of time and the conditions under which the eggs have been undergoing incubation or other preliminary operations for arousing them.

The reservoirs 95, 96 and 97 are filled with the desired wetting solution, and the vacuum pump connected to conduit 47b is started. The main pulley P is set in rotation.

The shaft 21 is driven and the wetting structures, testing structures and cleaning structures are caused to move toward and recede from one another twice for each revolution of the shaft 21. It is preferred that the lower elements of each structure should slightly raise the egg away from the conveyor belt CB at each operation, to assure a positive contact of the wetting wick 45 with the bottom of the egg under slight pressure, at the same time that the upper wick 45 encounters the top of the egg. Hence there is a slight frictional or rubbing effect applied to the egg at the time that the saturated wick is brought in contact therewith—a condition favorable for the penetration of the wetting solution through the shell of the egg. The cam 60 also effects the movement of the ratchet 28 and shaft 26 so that the conveyor belt CB is moved forward by steps, one step being produced following each movement of the wetting, testing and cleaning structures.

Eggs are now inserted in the supply trough 36 and permitted to feed downward until they are engaged and lifted by the pairs of pins 35 of the conveyor belt CB at each forward stepping movement of the conveyor belt past this feeding station. These eggs are therefore moved beneath the finger 200 of the counter IC, and are counted to show the total number of eggs tested by the machine. The eggs then successively encounter the wetting structure WS and are detained on the conveyor belt CB as it makes its stepwise movement until they have been sufficiently saturated for spots at top and bottom to overcome the initial high resistance of the egg shell. The eggs then move to the testing station TS.

As the egg is brought to a standstill at the testing station TS and the electrode structures are brought down and up into contact with it, the cam 52 causes a closure of the switch 55.

The contact of the electrode structures with the wet spots at top and bottom of the egg permits the inherent potential of the egg to manifest itself by potential difference between conductors 102a, 102b, this potential difference being superimposed upon a correcting or compensating potential difference introduced at potentiometer 107. Hence the same potential is applied across the grid, shunt, and resistor 108a, and operates to modify the spaced potential effects in the vacuum tube VT1. As a result of this, a current displacement occurs between the anodes of the two tubes, and the space charge is varied in the vacuum tube VT3, so that ultimately an output current flows from the anode of the vacuum tube VT3 to the winding of the relay MR. If the egg is "good", the potential difference causes this relay winding to be energized sufficiently to attract the armature and thus open-circuit the conductors from the transformer winding 139 on: on the other hand, if the egg is "bad", its inherent potential difference is lower, and a sufficient current does not flow through the relay winding to attract the armature, and hence this local circuit from the transformer winding 139 remains closed. If this local circuit remains closed at the time the switch 55 is closed, current flows to the solenoid 77 and energizes the same. As shown in Fig. 3, the energization of solenoid 77 causes its plunger 76 to impact upon and displace the rockable detent 74, so that the corresponding pin 70 is projected outwardly by its leaf spring 73. The solenoid 77 is de-energized when the switch 55 is again permitted to open by the cam 52, so that the plunger is withdrawn by spring 78. The detaining rocker member 74 cannot regain its former position, however, as it is blocked by a larger diameter of pin 70.

The continued rotation of shaft 21 causes the cam to advance the drum 29 by a further step, and then a further egg is tested, etc. This action continues.

It will be noted that the solenoid 77 is displaced angularly counterclockwise from the position of the lever 85 by a number of pins 70 corresponding to the number of eggs between the position of this lever 86 and the testing station TS. Hence as each egg comes onto the drum, the corresponding pin 70 is located substantially at the same radial plane through the axis of shaft 26.

If the egg has been tested and found "satisfactory" for hatching, its corresponding pin 70 has not been changed in position, and hence this egg in its movement around the drum moves against the pair of pins 35 forwardly of the aperture in which this egg has been resting, and then rolls from these pins onto the discharge trough or channel 81, and passes over the inked pad 201 which imprints this egg with suitable indicia, such as "Tested and found good, March 16, 1936", and may be removed to an incubator for hatching. On the other hand, if the egg has been tested and found "unsatisfactory" for hatching, its pin 70 has been projected downwardly so that this pin engages the lever 85 and causes a latching of the door 82 while this "unsatisfactory" egg is moving downward to a position opposite the opening 82 and trough 81. Hence the "unsatisfactory" eggs cannot escape into the trough 81, but are carried downward below the door 82, being detained by the pairs of pins 35, so that the eggs do not fall and break. Ultimately, these "unsatisfactory" eggs are discharged by the channel 88.

As each egg is either delivered through the opening 82 or carried past it, the corresponding pin 70 releases the lever 85 so that it can be moved back for engagement by the succeeding pin 70 for the next egg. The pins 70 are restored to the inward position by the cam plate 89, and are then detained by the corresponding detaining rocker 73, as described above.

In my copending application Serial No. 18,251, filed April 25, 1935, now Patent No. 2,102,646 dated December 21, 1937, the fact of inherent potential differences in eggs was set out, along with results obtained in testing the responses of such eggs. It is preferred in the present apparatus to have the egg in aroused condition, as by having it substantially at the temperature employed for incubation at the normal rate of development (around 100° F.). The effect of the period of incubation at such temperature is indicated in the table above. As a result of actual tests conducted by determining the inherent potential differences of the egg, on the basis of tests with many hundreds of eggs, it has been found that the present invention can be employed for correctly eliminating sterile eggs with an error of less than 5 percent. For example, the average percentage of sterile eggs was 8½ percent, and the present tests predicted 8¼ percent sterile, or an error of less than 3 percent.

With respect to eggs which are fertile and living when a test is made after from 2 to 6 hours incubation, these eggs may be considered in three groups: (1) eggs which die during incubation on account of constitutional malformation and weakness apparently respond to the test by being eliminated—a condition which is desirable as these eggs will have developed for a time, but die eventually and do not hatch. (2) Eggs which are fertile and living at the time of testing but die on account of unfavorable external circumstances such as breakage, poor techinque of incubation, lapse of too long a period between laying and setting, etc.,—that is, defects not arising from the actual vitality or lack of vitality of the particular egg; and also including eggs which are in a dying condition at the time the test is made. (3) Fertile eggs which hatch, of which substantially all are selected as "satisfactory" by the present invention, provided that the initial high resistance of the egg shells has been properly reduced by the preliminary treatment.

The second group of eggs above include those which are in a dying condition at the time of test. It has been found that eggs which are dying give an unusually high effect, which may be explained on the basis of the increased metabolism in dying tissues. In general, an egg which has died a short time before it is tested will still give the same indication as a satisfactory egg, which is to be foreseen, as it is known that the death of an animal does not mean the simultaneous death of all its organs and tissues. It is possible to test a group of eggs by the present method, selecting the satisfactory eggs in a first testing operation as being those which have an inherent potential greater than a certain value; and then to carry the eggs through a second testing operation in which a higher value than that normal for "satisfactory" eggs is employed: in this event, the "satisfactory" eggs will be discharged to the trough 86, while the eggs which are dying or have recently d:ed will be discharged to the trough 81. It will be understood, therefore, that the present invention includes the successive testing of eggs, and of their sorting into groups of opposite and low potential for "rejects", normal potential for "satisfactory" eggs, and the higher potentials for dying eggs.

It will be understood that the invention is not limited solely to the constructions and procedures set out above, but that this may be modified within many ways within the scope of the appended claims.

I claim:

1. Method of testing eggs, which comprises locally reduc'ng the electrical resistance between points of the egg which are at different levels of height by substantially eliminating the electrical resistance of the egg shell thereat, and determining the electromotive force between said points.

2. Method of testing eggs, which comprises wetting the eggs, while warm, at spaced points by a solution of electrolyte, and determining the electromotive force between said points.

3. Method of testing eggs, which comprises supporting the eggs in a definite position with the major ax's substantially horizontal for a time of about ten seconds to permit the germ to become oriented, wetting vertically spaced points of the egg shell, and determining the electromotive force between said points.

4. Method of testing eggs prior to the development of the embryo, which comprises supporting each egg in a definite position with the major axis horizontal for a time sufficient for a normal hatchable egg of the same period of incubation to orient itself, wetting the egg at vertically spaced points of the egg shell, and determining the electromotive force between said points.

5. Method of testing and sorting eggs, which comprises supporting the egg in a definite position with the major axis horizontal so that normal hatchable eggs of the same period of incubation may orient themselves, wetting the egg shells at vertically spaced points, determining the electromotive force between said points, and sorting the eggs into groups having similar values of electromotive force.

6. In an apparatus for testing eggs for life activity, an endless conveyor having means for supporting the eggs in definite position with the major axis horizontal, means for testing electromotive force and including electrodes having contact with the eggs, at least one said electrode being movable so that the electrodes may be brought into contact with the eggs, said testing means also including devices for locally preparing the egg shell prior to testing whereby to avoid the effect of the normal high resistance of the egg shell, and synchronizing means for advancing the conveyor intermittently and for moving said movable electrode for contacting the same with the eggs.

7. An apparatus as in claim 6, in which the preparing devices include a movable applicator for preparing the egg shell for the testing of the egg, said synchronizing means being connected for moving the applicator in substantial unison with the movable electrode.

8. An apparatus for testing eggs, including a conveyor, means for applying wetting solution at spaced points of each egg, means for testing the electromotive force between said spaced points of each egg, means for removing excess wetting solution from the eggs, and synchronized means for advancing the conveyor and for actuating said wetting, testing and cleaning means.

9. An apparatus for testing eggs, comprising an endless conveyor, a shaft, means for wetting the eggs including reciprocable devices, means for testing electromotive force of the eggs including reciprocable devices, means for turning said shaft, and means actuated by said shaft for intermittently moving the conveyor and for reciprocating said reciprocable devices in synchronism with movements of the conveyor.

10. An apparatus of the class described, comprising a conveyor structure including means effective for accomplishing the orientation of the germ of each egg so that the egg is positioned according to polarity prior to testing, means for testing electromotive force between vertically spaced points of each egg, said conveyor operating to present eggs in succession to said testing means, means for sorting the eggs into groups and including an electromagnetically actuated element, means for amplifying the current effects produced by said electromotive force, and circuit means connecting said amplifying means and said element so that the sorting means is operated in response to the values of electromotive force determined by said testing means.

11. An apparatus for testing eggs, including testing electrodes for contacting the eggs and determining the electromotive force thereof, an amplifier controlled by the difference of electromotive potentials between said electrodes, a source of electromotive force and connections therefrom to the testing electrodes and including adjustment means so that accidental currents of the circuits may be balanced, sorting means actuated by the amplified current, variable shunt means connected for varying the response of the sorting means to a given amplified current, and means for transferring the eggs from the testing electrodes to said sorting means.

12. Method of testing eggs, which includes positioning each egg with its major axis substantially horizontal for a time sufficient for substantial orientation of the germ of the egg, penetrating the egg shell at vertically spaced points by conductive electrodes, and determining the electromotive force between said points.

13. An apparatus for sorting eggs, which includes an endless conveyor having pairs of pins spaced apart a distance less than the length of an egg, each pair of pins being separated from adjacent pairs by distances greater than the minor axis diameter of an egg, said conveyor having between each two pairs of pins a centering recess which is smaller than an egg, means for supporting the conveyor so that it has a substantially horizontal flight with the pins uppermost, and a return flight, delivery means for presenting the eggs successively for individual lifting by pairs of pins as the pins pass toward said horizontal flight, each egg being received in a corresponding said recess while it passes along the horizontal flight, means for selectively receiving the eggs from the belt and pins and operative for sorting the eggs into groups as the pins pass from the horizontal flight to the return flight, and selector means including upper and lower electrodes and controlled by the electrical condition of the eggs for determining the actuation of the sorting and receiving means.

14. Method of testing and sorting eggs with respect to the life activity thereof, which comprises positioning each egg with the major axis thereof in a substantially horizontal position, determining the inherent electromotive force existing between spaced points of each egg, and sorting the eggs into groups having similar values of electromotive force.

15. Method of testing and sorting eggs with respect to the life activity thereof, which comprises warming the eggs to an optimum temperature of incubation for a period of at least one hour, determining the inherent electromotive force of each egg, and sorting the eggs into groups having similar values of electromotive force.

16. The method of testing eggs for life activity, which includes the step of positioning each egg with the major axis thereof in a substantially horizontal position, effecting a reduction of the electrical resistance between spaced points of the egg, placing the portion of the egg between said spaced points in an electric circuit including means responsive to voltage on the circuit, and determining the value of electrical effects arising from the egg.

17. Apparatus for testing and sorting eggs with respect to the life activity thereof, comprising means for supporting an egg with the major axis thereof in a substantially horizontal direction, means for determining the value of inherent electromotive force of the egg including electrodes for application to points of the egg which are at different levels of height, and means responsive to said determining means for sorting the eggs into groups having similar values of electromotive force.

18. An apparatus for testing eggs for life activity, comprising a conveyor having a feeding station and a testing station and means for supporting the eggs with the major axis horizontal and without movement about said axis, means for testing electromotive force including devices effective for reducing the electrical resistance offered by the eggs for preparing the eggs for such tests and also including electrodes engageable with the eggs as they are moved forward by the conveyor, means associated with the conveyor for sorting the eggs thereon into groups, said sorting means including preselecting devices actuated in response to said testing means, and means for driving the conveyor and sorting means and preparing devices at a rate such that each egg is held on the conveyor with its major axis horizontal for the time sufficient for the germ of a normal egg to become automatically oriented during the movement from the feeding station to the testing station before the egg is presented for determination by said testing means.

19. An apparatus for testing eggs, comprising a conveyor for receiving and transporting the eggs individually, means for applying wetting solution to spaced points on each egg shell, means for testing electromotive force of the eggs individually including electrodes for contacting the wetted portions of each egg shall, and means for driving the conveyor at a rate such that the germs in the eggs become oriented before the eggs pass for determination by said testing means.

20. Apparatus for testing eggs, comprising a conveyor having a feeding station, a testing station and a sorting station and means for supporting the eggs individually with the major axis horizontal and without movement about said axis, means at the testing station for testing electromotive force between spaced points at different levels of height of each egg as presented thereto by the conveyor, means for driving the conveyor at a rate such that each egg is held with its major axis horizontal for a time sufficient for the germ of a normal egg to become automatically oriented during the movement from the feeding station to the testing station before the egg is presented for determination by said testing means, and preselecting means at the sorting station controlled by the testing means for sorting the eggs into groups having similar values of electromotive force upon arrival of the individual eggs at the sorting station.

21. Apparatus for testing eggs, comprising a conveyor having a feeding station and a testing station and means for supporting the eggs with the major axis horizontal and without movement about said axis, means at the testing station for testing electromotive force between spaced points at different levels of height of each egg as presented thereto by the conveyor, means for driving the conveyor at a rate such that each egg is held with its major axis horizontal for a time sufficient for the germ of a normal egg to become automatically oriented during the movement from the feeding station to the testing station before the egg is presented for determination by said testing means, and means controlled by the testing means for indicating the relative hatchability of the eggs.

22. The method of selecting eggs for hatching purposes, which comprises maintaining the eggs at an incubation temperature for a time at least sufficient to arouse the same, positioning each egg with the major axis thereof in a substantially horizontal position, determining the inherent electromotive force existing between spaced points of each egg, and sorting the eggs into groups having similar values of electromotive force, including a group selected for hatching purposes and comprising eggs having not less than a predetermined value of electromotive force which is demonstrated by hatchable eggs of like history.

23. The method of selecting eggs for hatching purposes, which comprises maintaining the eggs at an incubation temperature for a predetermined period of time, positioning each egg with the major axis thereof in a substantially horizontal position, determining the inherent electromotive force existing between spaced points of each egg, and sorting the eggs into groups having similar values of electromotive force, including a group selected for hatching purposes and comprising eggs having not less than a predetermined value of electromotive force which is demonstrated by hatchable eggs of like history.

FREDERICK L. RIVENBURGH.